April 19, 1960 E. M. HYDE ET AL 2,933,281
APPARATUS FOR SUPPLYING A DESIRED WEIGHT OF
MATERIAL TO A RECEIVING RECEPTACLE
Filed April 1, 1955 3 Sheets-Sheet 1

Inventors:
Edward M. Hyde
John W. Powischill
by Howson & Howson
Att.

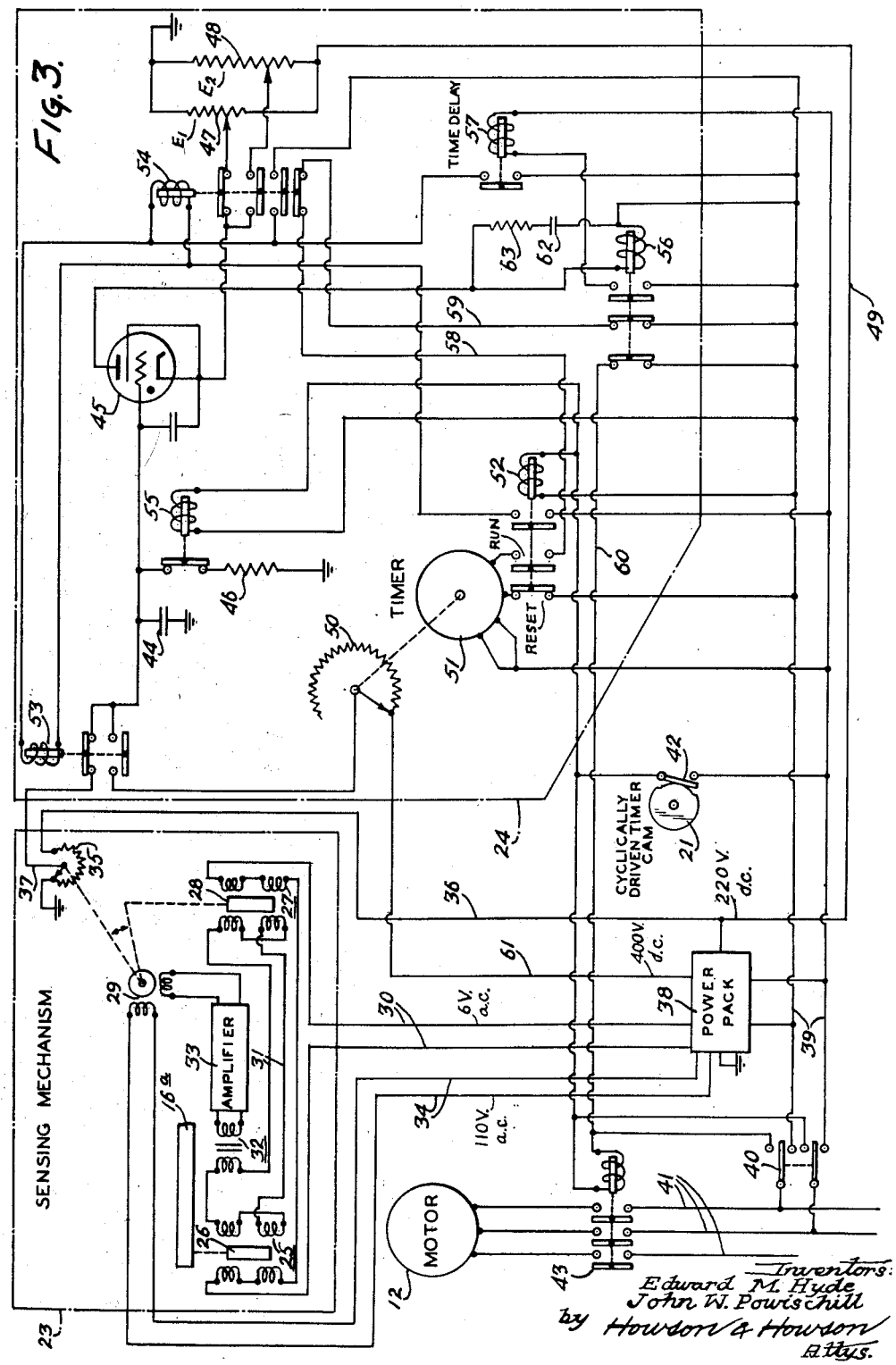

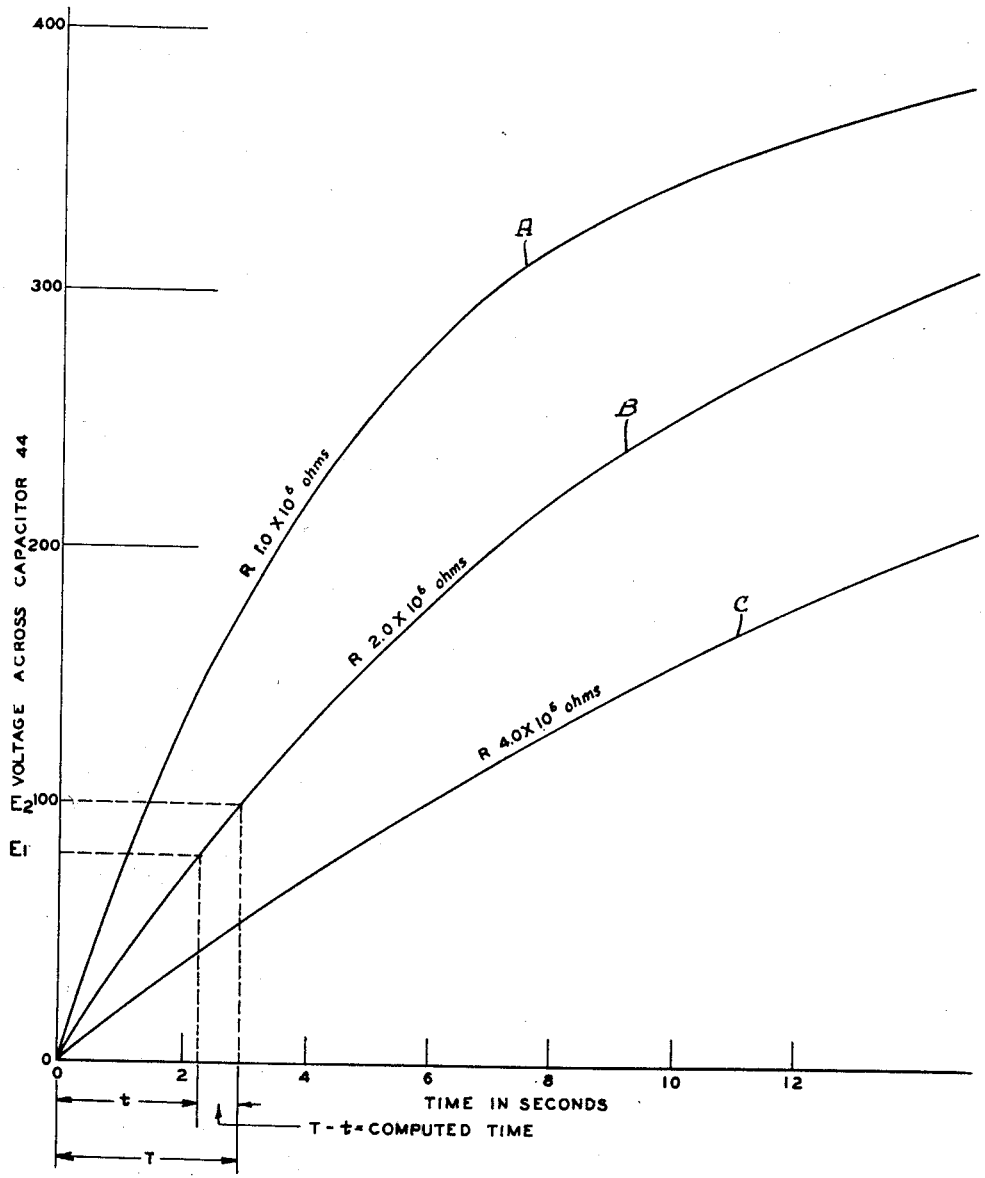

2,933,281

APPARATUS FOR SUPPLYING A DESIRED WEIGHT OF MATERIAL TO A RECEIVING RECEPTACLE

Edward M. Hyde, Lafayette Hill, and John W. Powischill, Cheltenham, Pa., assignors to Proctor & Schwartz, Inc., Philadelphia, Pa., a corporation of Pennsylvania Application April 1, 1955, Serial No. 498,466

7 Claims. (Cl. 249—2)

This invention relates to devices for effecting and controlling the supply of a desired weight of material to a receiving receptacle. The invention is particularly applicable to the successive measuring and feeding of a predetermined quantity of some material such as fibrous material. In a desirable form of such a device or apparatus, the desired object is accomplished by successive weighing of the material in a weighing type feed arrangement.

The practice generally followed heretofore in weighing feed arrangements, especially those of the Bramwell type, is to weigh the stock delivered into the scale pan, or equivalent receptacle, by means of a simple balance type scale beam pivoting about a knife edge fulcrum. A movable weight positioned above an arbitrary scale is used to make weight adjustments to meet production requirements. It was also common practice to attach a knife edge or similar device at the extreme end of the weighted side of the beam. The knife edge rests against a trigger mechanism which coacts with means for stopping the spike apron whenever the trigger mechanism is released by the scale beam movement. The trigger mechanism is positioned by means of a conventional timing cam which actuates levers for opening and closing the scale pan trap doors which form part of the scale pan means. The timing cam rotates at a comparatively uniform rate actuating the scale pan trap doors a predetermined number of times per minute to discharge the stock, and to close the trap doors, resetting the trigger mechanism and starting up the spike apron for another weighing cycle. As the spike apron and its coacting doffing means discharge the stock into the scale pan, the latter moves in a downwardly direction pivoting about the fulcrum, thereby causing the knife edge affixed to the weighted end of the scale beam to move in an upwardly direction bearing against the face of the trigger mechanism. When the accrued weight in the scale pan overcomes the balance weight and the drag of the knife edge against the trigger mechanism, the scale beam moves in an upwardly direction releasing the trigger mechanism which actuates the means for stopping the apron, thus preventing further delivery of stock into the scale pan during the remainder of the weighing cycle. The timing mechanism, meanwhile, has rotated through its prescribed path and actuates a lever to open the scale pan trap doors discharging the weighed stock. Further rotation of the timing cam resets both the scale pan trap doors and the trigger mechanism, thereby actuating the spike apron to repeat the weighing cycle.

The method of weighing stock as described above has several serious defects which adversely affect the uniformity of the successive weighings; namely: The scale beam is not a frictionless, free floating balanced beam, but is subject to considerable variable frictional drag due to its physical contact with the trigger mechanism during its upward traverse against the face of the trigger, especially when the trigger is improperly adjusted to the knife edge. Any excessive pressure exerted by the trigger against the scale beam knife edge will cause weighings in excess of the desired weight. Secondly, in the prior method and apparatus, little if any consideration was given to the effect of the force of impact of the masses of fiber propelled with considerable momentum into the scale pan. At times, large masses of fibers are propelled downwardly by the doffing means with sufficient force to momentarily swing the scale beam far enough to prematurely release the trigger mechanism and result in a light weighing. Thirdly, during the loading of the scale pan there is a constant impact factor attributable to the steady falling of stock into the scale pan. Therefore, the scale actually weighs the deposited stock and also the force of impact. Fourthly, due to the inherent inertia of the weighing mechanism, the movement of the scale pan lags behind the actual rate of deposit of stock into the scale pan. The lag in the scale pan movement tends to give weighings in excess of the static weight. As a result, whenever the rate of stock delivery into the scale pan varies, the inertia effect of the scale pan varies correspondingly, thereby causing fluctuations in the delivered weighings.

Means were not available in the prior art to compensate for the above-mentioned factors, which not only cause long term variations and short term variations, but also contribute to the erratic fluctuations in successive weighings, which combine with other variables, such as possible changes in the character of the stock, the density of the stock as loaded in the feed hopper and variations in the spike apron speeds. Therefore, since the weighing means could only be statically balanced, the balancing was not effective and accurate calibration was impossible.

With the foregoing in mind, the principal object of the present invention is to provide a novel apparatus for accurately and consistently obtaining uniform weighings of fibrous and other materials delivered into the scale pans of weighing type feeds without the disadvantages and defects aforementioned.

In accordance with this invention, provision is made for computing the stock delivery rate of the spike apron and its doffing means during an initial feeding operation, then interrupting delivery of the stock to obtain a stabilized weighing and computing the time required, at the determined rate of feed, to increase the weight of delivered stock to the desired value, and finally actuating the spike apron and its doffing means the computed length of time required to obtain the exact desired weight.

It is well known to the art that, for practical purposes, the delivery rate of a spike apron of any weighing type feed is proportional to the surface speed of the spike apron for a given hopper loading and stock consistency. It is also well known that variations in the quantity of stock in the hopper affect the delivery rate, as does the spike apron slippage. Therefore, means are provided, hereinafter more fully described, in the form of an analog computer to calculate, during a brief predetermined interval of time during which the scale pan is allowed to come to rest for a test weighing under stabilized conditions, the true rate at which the stock was delivered into the scale pan by the spike apron during the initial loading cycle. The analog computer further calculates the additional time required for the spike apron to deliver the exact amount of stock required to give the desired weighing, and further serves to actuate the spike apron for exactly the computed length of time, independently of all friction and impact factors, and independently of the sensing mechanism which during the initial loading of the scale pan furnished the analog computer with the information upon which the calculations were based. These computations are automatically made during each weighing cycle, hence, any possible variation in the feeding rate, as well as the impact factor and density of stock, are compensated for during each individual weighing cycle.

The invention may be fully understood by reference to the accompanying drawings, wherein Fig. 1 shows a weighing-type feed arrangement which is preferably employed;

Fig. 3 is a diagrammatic illustration of an electrical system which may be employed according to the present invention; and Fig. 4 shows explanatory graphs or curves.

Figure 1:
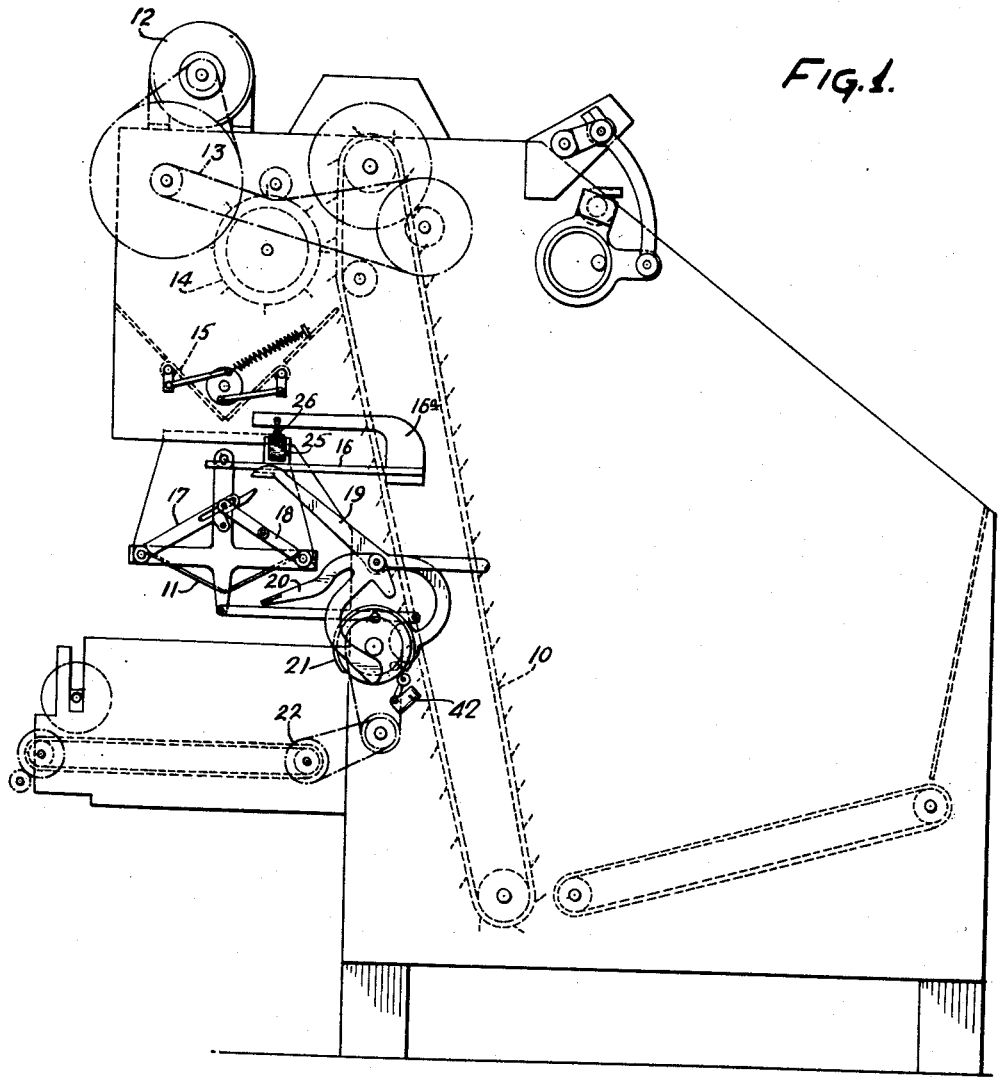

Referring first to Fig. 1, there is shown a weighing feed apparatus of the well-known Bramwell type, with the necessary modifications for the purpose of the present invention. In this apparatus, a spike apron 10 serves to deposit material into the scale pan 11 which is of trap-door form so that it may be opened periodically to discharge the material. The spike apron 10 is driven by a motor 12 through a belt drive 13. Doffing means 14 serves to strip the material from the spike apron to discharge it into the scale pan by way of the hopper 15. The scale pan 11 is supported by the scale beam 16 and is opened and closed through actuation of mechanism comprising arms 17 and 18 and actuating levers 19 and 20, the latter being operated by a continuously driven timing cam means 21. In practice, the timing cam means 21 is driven through drive 22 from the apparatus (not shown) which carries away the material discharged from the scale pan. In operation, the continuously driven cam means 21 opens and closes the scale pan at regularly timed intervals, and during each operating cycle the drive motor 12 for the spike apron 10 operates to cause deposit of a quantity of material in the scale pan, after which the motor 12 is deenergized and the scale pan is opened to discharge the material. Except for the character of the scale beam, the apparatus as thus far described is conventional, and the illustration of Fig. 1 and the foregoing brief description are deemed to be sufficient for the present purpose.

As hereinbefore stated, the conventional mechanism for controlling the weighing operation during each operating cycle has certain serious defects which are overcome by the present invention. For the purpose of this invention, the conventional weight-adjusting means and the trigger mechanism are eliminated and in accordance with the preferred form of this invention the control system presently to be described is provided to effect accurate weighing of the material during each operating cycle.

The scale beam 16 preferably is a resilient cantilever beam having one end secured to a rigid support 16a. The beam 16 is deflected downwardly by the weight of material deposited in the scale pan, and when the material is discharged the beam returns to its normal position. As hereinafter described, the beam deflection is sensed during an initial feeding operation to determine the rate of feed. The use of a cantilever beam is preferable to the use of the conventional scale beam, because it eliminates the objections incident to the use of a fulcrum.

Referring now to Fig. 3 the control system comprises generally a sensing mechanism, designated by reference numeral 23, and an analog computer, designated by reference numeral 24. The sensing mechanism serves, during an initial portion of the weighing cycle, to supply information to the computer relative to the true or exact rate of deposit of material in the scale pan. On the basis of the information furnished by the sensing mechanism, the computer determines and controls the time duration of a final feeding operation to deposit the exact desired weight of material in the scale pan.

Figure 2:
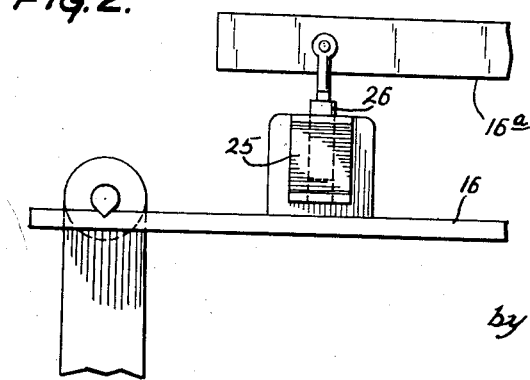
Fig. 2 shows on larger scale the sensing means which is preferably employed in association with the scale beam.

The sensing mechanism 23 may comprise a known type of null balance servo system as shown employing transducers of the differential transformer type. As shown in Figs. 1 and 2, a differential transformer 25 is mounted on the scale beam 16, and associated therewith is a core 26 which is suspended from the support 16a. A second differential transformer 27 is provided having stationary coils and a movable core 28 which is actuated by a servo motor 29. The two transformers have their primary windings serially connected in a low voltage supply circuit 30, and have their secondary windings connected in opposition as shown in a secondary circuit 31 which includes the primary of a transformer 32. In the balanced condition of the system there is no input to the amplifier 33. In operation, deflection of beam 16 unbalances the system through the transducer 25, in proportion to the deflection of the scale beam 16, and thus produces an input to amplifier 33 which is connected to one phase of the two-phase servo motor 29 whose other phase is energized continuously from supply line 34. The servo motor operates the rebalancing transducer 27 and also drives a precision potentiometer 35 which is connected to a positive D.C. supply conductor 36. Thus, the servo-type system serves to actuate the potentiometer 35 from zero position precisely in proportion to the amount of material deposited in the scale beam. The potentiometer 35 is of the precision linear resistance type, and it supplies, via its output conductor 37, a D.C. voltage which varies from zero in direct proportion to the weight of material deposited in the scale pan.

The low A.C. voltage (e.g. 6 volts) supplied to the transducers 25 and 27, and the positive D.C. voltage (e.g. 220 volts) supplied to potentiometer 35 are provided by means of a conventional power pack 38 connected to supply line 39. The latter is connectable through manual switch 40 to two of the conductors of a three-phase 220 volt supply line 41 which supplies the drive motor 12 for the spike apron. Conductors 34, which supply one phase of the servo motor 29, are supplied with a suitable A.C. voltage from the power pack 38.

The cyclic operation of the system is effected by means of a timing switch 42 (see also Fig. 1) which is cyclically operated by the continuously driven cam means 21. This switch performs a number of functions, as hereinafter described, one of which is to initiate energization of a relay or contactor 43 to initiate energization of the drive motor 12 for the spike apron. Referring particularly to the analog computer 24 shown in Fig. 3 a capacitor 44 is connected in parallel with the grid of a thyratron 45. A discharge circuit for the capacitor is provided comprising a discharge resistor 46. The thyratron 45 is adapted to be biased by either of two potentials derived respectively from potentiometers 47 and 48 which are connected to positive D.C. supply conductor 49. These potentiometers are of the precision linear resistance type, and they are preadjusted to provide voltages $E_1$ and $E_2$, respectively representing the aforementioned test weight and desired weight. The computer further comprises a rheostat 50 of the precision linear resistance type which is driven by a constant-speed resettable timer 51, and is connected to a positive D.C. (e.g. 400 volts) supply conductor 61. The timer is of conventional form, having a "run" circuit and a "reset" circuit. Such a timer may comprise a synchronous driving motor and a driven shaft biased to home or zero position by a spring and having a holding ratchet and pawl released by a solenoid when the reset circuit is closed. Relay 52 controls the timer circuits. Other relays 53 to 57 perform functions hereinafter described. It should be noted that the "run" circuit of timer 51 extends through normally-closed contacts of relays 54 and 56 via connections 58 and 59.

In the inoperative condition of the system, the various circuit elements are as shown in Fig. 3. Potentiometer 47 is adjusted to give a voltage $E_1$ representative of the test weight, while potentiometer 48 is adjusted to give a voltage $E_2$ representative of the final desired weight. The scales of these potentiometers are calibrated to read either in ounces or pounds. The test weight may be any suitable percentage of the final desired weight, for example 80 or 90% thereof. As previously mentioned, the timing cam means 21 is continuously driven at a constant speed.

To initiate operation, the manual switch 40 is closed in its lower position to apply voltage to supply line 39. When the cam means 21 reaches the starting point in its operating cycle, it closes the scale pan and then closes switch 42 to initiate operation of the drive motor 12 for the spike apron 10 (Fig. 1) by energization of relay 43 whose energizing circuit extends through normally closed contacts of relay 56 via connection 60. Closure of switch 42 also energizes relays 52 and 55. Energization of relay 52 opens the reset circuit and closes the run circuit of timer 51, and thus causes operation of timer 51 to drive rheostat 50 from its zero position. Energization of relay 55 opens the discharge circuit for capacitor 44. At this time, the other relays remain deenergized as shown.

As material is delivered to the scale pan by the spike apron, the sensing mechanism operates and potentiometer 35 supplies an increasing D.C. voltage to capacitor 44 and to the grid of thyratron 45 through the upper closed contacts of relay 53. As the same time, rheostat 50 is driven from its zero position by the timer 51. The purpose of this is to establish a value R of the resistance of rheostat 50 proportional to the rate of deposition of the material in the scale pan during the initial test weighing operation.

When the voltage applied to the grid of thyratron 45 reaches the value of the voltage $E_1$, the thyratron fires and energizes relay 56 which deenergizes contactor 43 to stop the motor 12. Series connected capacitor 62 and resistor 63 are shunted across the coil of relay 56 to limit the amount of current drawn by the relay and to prevent surge of high peak voltages through the thyratron. Relay 56 also opens the run circuit of timer 51 to stop rheostat 50 and also energizes time delay relay 57. It should be noted that the timer 51 merely stops and does not reset, as relay 52 is still energized and the reset circuit is open. The time delay pick-up of relay 57 permits the depositing of any material in transit between the spike apron and the scale pan, and also allows the scale pan to come to rest. During this short interval, voltage is being applied to the capacitor 44 from the potentiometer 35, but any increase in charge of the condenser is proportional to the weight of the material that falls onto the scale pan after the spike apron has stopped.

When relay 57 picks up after a short time interval, it energizes relays 53 and 54. Relay 53 disconnects the sensing mechanism and connects rheostat 50 to capacitor 44. Relay 54 removes voltage $E_1$ from the cathode of the thyratron 45 and connects voltage $E_2$ to the cathode. Relay 54 also locks in both itself and relay 53 independently of relay 57, and also opens the run circuit of timer 51 independently of relay 56.

The removal of voltage $E_1$ causes the thyratron to stop, thereby deenergizing relay 56 which energizes contactor 43 to restart the motor 12 and also deenergizes relay 57. However, timer 51 does not restart due to the fact that its run circuit is open at the lowermost contacts of relay 54. The application of voltage $E_2$ raises the firing level of the thyratron.

The restarting of motor 12 initiates the final feeding operation during which capacitor 44 is further charged through the established resistance R of rheostat 50 from D.C. supply conductor 61. Thus, during this final feeding operation, the capacitor 44 is charged at a rate previously determined during the test weighing operation. In other words, the timing of the final feeding operation is effected by the R-C combination of rheostat 50 and capacitor 44, R being the established resistance of the rheostat and C being the capacitance of the capacitor. As the capacitor 44 is further charged, the voltage on the grid of thyratron 45 rises accordingly and when it reaches the value of voltage $E_2$, the thyratron again fires and again energizes relay 56. The latter deenergizes contactor 43 to stop the motor 12 and thereby stops the feed of material to the scale pan.

Shortly thereafter, the cycle control switch 42 opens and deenergizes relays 52 and 55. Relay 52 deenergizes relays 53 and 54, and relay 55 closes the discharge circuit for capacitor 44. The deenergization of relay 52 also closes the reset circuit of timer 51, which causes return of rheostat 50 to its zero position. Removal of the voltage from the grid of the thyratron 45 causes it to stop, thereby deenergizing relay 56. The system is now in its inoperative condition, ready for the next operating cycle.

Simultaneous with the opening of switch 42 to terminate the cycle, the timing cam means 21 opens the scale pan to discharge the material therefrom, causing the scale beam 16 (Fig. 1) to return to its unloaded position. This in turn causes the sensing mechanism to return to its starting condition, potentiometer 35 being returned to its zero position.

From the foregoing description, it will be seen that during the initial test weighing, capacitor 44 is charged to an arbitrary voltage level $E_1$, at a rate according to the rate of feed of the material; and at the same time, rheostat 50 is adjusted to a value R according to the rate of feed of the material. The feeding of the material is then stopped as the result of the firing of thyratron 45 and the apparatus is permitted by the action of time delay relay 57 to stabilize during a short interval during which period timer 51 and coacting rheostat 50 are retained in their operative positions. Any material to the scale pan causes corresponding increase of the charge on capacitor 44. At this instant the charge on the capacitor, and the voltage thereacross, represents the weight of material in the scale pan. And this voltage level and the adjusted value R of the rheostat 50 determines the time during which the capacitor must be further charged, during the final feeding operation, to raise the voltage level of the capacitor to the fixed voltage level $E_2$, which represents the desired final weight.

Thus, during initial test weighing and stabilizing periods, the analog computer effectively computes the time required for the final feeding operation, by establishing a voltage level of capacitor 44 representative of weight of material in the scale pan at the end of said periods, and by establishing a value R of rheostat 50 representative of the rate of feed of the material.

During the final feeding operation, the control system is completely independent of the weighing scale and operates to time the duration of the final feed. This timing is effected by further charging the capacitor through the resistance R from a constant voltage source until the voltage level of the capacitor reaches the fixed voltage level $E_2$. Thus this final operation is independent of all friction and impact factors which have adversely affected prior weighing feed arrangements.

Furthermore, since the computation of the time duration of the final feeding operation is made during each weighing cycle, the system compensates for any variation in the feeding rate or the density of the stock.

It will be apparent that the voltage rising characteristic of capacitor 44, during the charging thereof through resistance R, should be substantially linear in order that the timing of the final feeding operation shall be accurate. This may be assured by using a sufficiently high charging voltage, in relation to $E_1$ and $E_2$, so that the operation takes place along a linear portion of the voltage rising characteristic.

Fig. 4 shows typical curves A, B and C representing the charging of the capacitor (capacitance 4 microfarads), with different values of R, from a source of 400 volts, $E_2$ being one-fourth of the charging voltage and $E_1$ having some value less than $E_2$. Thus, in the case of curve B, the time required to charge the capacitor from $E_1$ to $E_2$ is represented by the distance between the vertical broken lines.

The mathematical analysis is as follows:

The voltage across the capacitor 44 rises in accordance with the formula $$e = E\left(1 - \epsilon^{\frac{-t}{RC}}\right)$$

where $e$=instantaneous voltage across the capacitor in volts
$E$=applied voltage in volts
$t$=time in seconds
$R$=resistance in ohms
$C$=capacity of the capacitor in farads
$\epsilon$=2.718

Below $$\frac{1}{4}E$$

the charging curve is essentially linear, and the formula becomes $$e = \frac{E}{RC} t$$

for practical purposes. Now since the discharge of material into the scale pan is at a constant rate for any given cycle and the output of scale pan sensing device in volts is directly proportional to the weight in the scale pan, the charging curve can be made analogous to the accumulation of weight in the scale pan with respect to time by selecting the correct resistance R. This is done by adjusting R, during the initial test weighing operation, according to the equation $t=KR$, where K is a constant. Then if $t$ is the time to make the test weigh, $T-t$ is the computed time which the feed must run after the test weigh to reach final weight.

$$T - t = \frac{E_2}{\frac{E_1}{t}} - t = t\left(\frac{E_2}{E_1} - 1\right)$$

but $t = KR$
hence $$T - t = KR\left(\frac{E_2}{E_1} - 1\right)$$

Also if $W_1$=test weight and
$W_2$=final weight, then $$T - t = \left(\frac{W_2}{W_1} - 1\right)$$

Therefore, in accordance with the above description the test and final weights can be obtained by adjustment of the voltages $E_1$ and $E_2$ before beginning operation. Thereafter in the system described timing of the feed necessary to make the test weigh, analogue determination of the balance of the time necessary to complete the feed and actual timing of the time to complete the feed are accomplished automatically.

The actual time required for a weighing cycle is variable and depends upon the production requirements. If, for instance three weighings per minute were required, each complete weighing cycle would occur every twenty seconds. It is customary in the art to adjust the surface speed of the spike apron so that the desired weight is attained in from one-half to two-thirds of a weighing cycle, that is, in the time that elapses from the time the scale pan trap doors close until they open to discharge the stock. Hence the allotted time for test weighing of stock, computing the rate of delivery of stock into the scale pan, and actuating of the spike apron the second time in order to attain the desired weight, would be approximately ten seconds.

It will be recalled that operation is initiated by closing the manual switch 40 (Fig. 3) in its lower position, and the apparatus then functions automatically to make successive weighings until the switch 40 is opened. When the apparatus is first started, the first few weighings may be inaccurate, as where the feed is not yet stabilized or the closing of switch 40 happens to take place at a time when the timer switch 42 is closed and insufficient time remains for a complete cycle. In such case the first few weighings may be discarded.

In practice, it is frequently desired to change the type of stock being processed, at which time the spike apron must be actuated independently of the weighing means in order to clean out the feed hopper. By closing switch 40 in its upper position, contactor 43 may be energized to operate the spike apron independently of the weighing system.

While a particular embodiment of the invention has been illustrated and described, the invention is not limited thereto but contemplates such modifications and other embodiments as may occur to those skilled in the art. The method of the invention is not limited to forms of apparatus herein described.

We claim:

1. Apparatus for supplying a desired weight of material to a receiving receptacle, comprising: a receptacle; weighing means supporting said receptacle; power-operated means for feeding material at constant weight rate to said receptacle; means responsive to the weighing means for effecting a limited initial operation of said feeding means until the weight of the material in said receptacle reaches a predetermined value less than the desired value; means set in accordance with the rate of deposit of material in said receptacle during the initial feeding of material; and means responsive to the setting of said last mentioned means for effecting final operation of said feeding means during a time interval which, at said rate of deposit of material in said receptacle, is required to increase the weight of material in said receptacle to the desired value.

2. Apparatus for supplying a desired weight of material to a receiving receptacle, comprising: a receptacle; weighing means supporting said receptacle; power-operated means for feeding material at constant weight rate to said receptacle; a circuit including a capacitor; means responsive to the weighing means for effecting a limited initial operation of said feeding means; means in said circuit responsive to the weight of material in the receptacle for charging said capacitor, during said initial feeding of material, proportionately to the weight of material supplied to said receptacle; means for interrupting the operation of said feeding means when the voltage across said capacitor reaches predetermined value representative of a predetermined weight of material less than the desired weight; means for determining, as a result of said initial feeding, the time required for further charging of said capacitor to increase the voltage thereacross to a predetermined value representative of a selected desired weight; and means for effecting final operation of said feeding means for the determined time, thereby to increase the weight of material in said receptacle to the desired weight.

3. Apparatus for supplying a desired weight of material to a receiving receptacle, comprising: a receptacle; weighing means supporting said receptacle; power-operated means for feeding material at constant weight rate to said receptacle; a circuit including a capacitor; a variable resistor; means responsive to the weighing means for effecting a limited initial operation of said feeding means; means in said circuit responsive to the weight of material in the receptacle for charging said capacitor, during said initial feeding of material, proportionately to the weight of material deposited in said receptacle; means operable during said initial feeding of material to adjust said resistor from zero value to a value dependent upon the time duration of such feeding; means for interrupting the operation of said feeding means when the voltage across said capacitor reaches a predetermined value representative of a predetermined weight of material less than the desired weight; means for effecting final operation of said feeding means; means for further charging said capacitor through said resistor coincidently with said final operation; and means for interrupting said final operation when the voltage across said capacitor reaches a predetermined value representative of the desired weight of material.

4. Apparatus for supplying a desired weight of material to a receiving receptacle, comprising: a receptacle; weighing means supporting said receptacle; power-operated means for feeding material at constant weight rate to said receptacle; a circuit including a capacitor; a variable resistor; means responsive to the weighing means for effecting a limited initial operation of said feeding means; means in said circuit responsive to the weight of material in the receptacle for charging said capacitor, during said initial feeding of material, proportionately to the weight of material deposited in said receptacle; means operable during said initial feeding of material to adjust said resistor from zero value to a value dependent upon the time duration of such feeding; means including a triggerable electron tube for interrupting the operation of said feeding means; means for applying the voltage across said capacitor to said tube; means for initially establishing a triggering voltage level for said tube representative of a predetermined weight of material less than the desired weight, whereby said tube is triggered when the voltage across said capacitor reaches said triggering voltage level; means responsive to the resistor determining the period of final operation of said feeding means; means for further charging said capacitor through said resistor coincidently with said final operation; and means for establishing a second triggering voltage level for said tube representative of the desired weight of material, whereby said tube is triggered to interrupt said final operation when the voltage across said capacitor reaches said second triggering voltage level.

5. In a weighing apparatus; a scale pan; a scale beam supporting said pan; power-driven means for feeding material at constant weight rate to said pan; means for effecting a limited initial operation of said feeding means; means responsive to the movement of said beam for interrupting the operation of said feeding means when the weight of material fed to the pan by the feeding means reaches a value representative of a predetermined weight of material less than a selected desired weight; means for determining, as a result of said initial feeding, the time required to increase said predetermined weight to a value representative of the desired weight; means responsive to the means for determining the period of final operation of said feeding means for the determined time.

6. In a weighing apparatus; a scale pan; a scale beam supporting said pan; motor-driven means for feeding material at constant weight rate to said pan; a circuit including a capacitor; means responsive to the weighing means for effecting a limited initial operation of said feeding means; means responsive to movement of said beam for producing a voltage which increases from zero proportionately to the beam movement; means for applying said voltage to said capacitor to charge the same; means for interrupting the operation of said feeding means when the voltage across said capacitor reaches a predetermined value representative of a predetermined weight of material less than a selected desired weight; means for determining, as a result of said initial feeding, the time required for further charging of said capacitor to increase the voltage thereacross to a predetermined value representative of the desired weight; and means for effecting final operation of said feeding means for the determined time, thereby to increase the weight of material in said scale pan to the desired weight.

7. In a weighing apparatus; a scale pan; a scale beam supporting said pan; motor-driven means for feeding material at constant weight rate to said pan; a circuit including a capacitor; a variable resistor; means responsive to the weighing means for effecting a limited initial operation of said feeding means; means responsive to movement of said beam for producing a voltage which increases from zero proportionately to the beam movement; means for applying said voltage to said capacitor to charge the same; means operable during said initial feeding of material to adjust said resistor from zero value to a value dependent upon the time duration of such feeding; means for interrupting the operation of said feeding means when the voltage across said capacitor reaches a predetermined value representative of a predetermined weight of material less than a selected desired weight; means for effecting final operation of said feeding means; means for further charging said capacitor through said resistor coincidently with said final operation; and means for interrupting said final operation when the voltage across said capacitor reaches a predetermined value representative of the desired weight of material.

References Cited in the file of this patent

UNITED STATES PATENTS

| Re. 23,830 | Monjonnier | May 18, 1954 |
| 964,388 | Burrows | July 12, 1910 |
| 1,889,663 | Ilyus | Nov. 29, 1932 |
| 1,986,268 | Hughes et al. | Jan. 1, 1935 |
| 2,047,203 | Henson | July 14, 1936 |
| 2,066,763 | Bryce | Jan. 5, 1937 |
| 2,098,324 | Ward et al. | Nov. 9, 1937 |
| 2,323,023 | Flanagan et al. | June 29, 1943 |
| 2,371,040 | Fisher et al. | Mar. 6, 1945 |
| 2,534,801 | Siltamaki | Dec. 19, 1950 |
| 2,581,205 | Reilly | Jan. 1, 1952 |
| 2,597,831 | Willis | May 20, 1952 |
| 2,702,177 | Jee et al. | Feb. 15, 1955 |
| 2,729,213 | Broekhuysen et al. | Jan. 3, 1956 |